United States Patent
Bequet

(10) Patent No.: US 6,663,314 B2
(45) Date of Patent: Dec. 16, 2003

(54) DEVICE FOR JOINING A PANEL AND A STRUCTURE, ABLE TO TRANSMIT SIGNIFICANT FORCES

(75) Inventor: Franck Bequet, Fonsorbes (FR)

(73) Assignee: Airbus France, Toulouse Cedex (FR)

( * ) Notice: Subject to any disclaimer, the term of this patent is extended or adjusted under 35 U.S.C. 154(b) by 45 days.

(21) Appl. No.: 10/052,258

(22) Filed: Jan. 23, 2002

(65) Prior Publication Data

US 2003/0205011 A1 Nov. 6, 2003

(30) Foreign Application Priority Data

Feb. 22, 2001 (FR) .............................. 01 02387

(51) Int. Cl.[7] .............................. B64C 3/28; F16B 12/14
(52) U.S. Cl. .................................. 403/408.1
(58) Field of Search .................. 403/6, 7, 118, 403/167, 231, 264, 408.1, 411; 52/19, 282.2, 581.1, 582.1, 584.1; 244/123, 131; 416/229 R, 230, 239, 241 A, 248

(56) References Cited

U.S. PATENT DOCUMENTS

| 571,042 | A | * | 11/1896 | Edquist ........................ 403/8 |
|---|---|---|---|---|
| 2,392,835 | A | * | 1/1946 | Conlon ........................ 52/19 |
| 2,747,638 | A | * | 5/1956 | Cederquist ................. 411/104 |
| 2,815,997 | A | * | 12/1957 | Korb ........................ 52/584.1 |
| 3,835,610 | A | * | 9/1974 | Harper et al. .............. 403/231 |
| 3,958,375 | A | * | 5/1976 | Tully ........................ 52/80.2 |
| 4,332,495 | A | * | 6/1982 | Burgers ........................ 403/6 |
| 4,392,677 | A | * | 7/1983 | Hardouin ................. 285/124.5 |
| 4,412,784 | A |   | 11/1983 | Wackerle et al. |
| 4,525,974 | A | * | 7/1985 | Steidle-Sailer et al. ....... 52/693 |
| 4,732,542 | A | * | 3/1988 | Hahn et al. ................. 416/226 |
| 4,976,565 | A | * | 12/1990 | Stefan ........................ 403/8 |
| 5,171,099 | A |   | 12/1992 | Westre |
| 5,265,971 | A | * | 11/1993 | Duc ........................ 403/231 |
| 5,647,174 | A | * | 7/1997 | Mattarelli ................... 52/36.3 |
| 5,810,505 | A | * | 9/1998 | Henriott et al. ............. 403/230 |
| 5,934,819 | A | * | 8/1999 | Mangold ................. 403/408.1 |
| 6,050,033 | A | * | 4/2000 | Wrightman ................. 52/93.1 |
| 6,371,730 | B1 | * | 4/2002 | Wobben ................. 416/244 R |
| 6,468,616 | B1 | * | 10/2002 | Bristow ....................... 428/61 |

FOREIGN PATENT DOCUMENTS

| DE | 19733372 | | 1/1999 | |
|---|---|---|---|---|
| EP | 1000243 | | 2/1999 | |
| FR | 2683007 | | 4/1993 | |
| WO | WO 99/06694 | * | 2/1999 | ............. 416/244 R |

* cited by examiner

Primary Examiner—J. J. Swann
Assistant Examiner—Ruth C. Rodriguez
(74) Attorney, Agent, or Firm—Thelen Reid & Priest LLP; Robert E. Krebs

(57) ABSTRACT

A device for joining a panel and another structure.

The device (10) includes a plurality of mounts (16) evenly distributed along the interface (I) between the panel (12) and the structure (14). Each mount (16) comprises a tension screw approximately perpendicular to the interface (I) and a nut embedded in the panel (12), close to the latter. To allow the transmission of more significant forces, the nuts are arranged in at least two different rows (R1, R2, R3), parallel to the interface (I). Moreover, the nuts of the adjacent mounts are located in different rows.

9 Claims, 3 Drawing Sheets

DEVICE FOR JOINING A PANEL AND A STRUCTURE, ABLE TO TRANSMIT SIGNIFICANT FORCES

This application claims priority under 35 U.S.C. §§119 and/or 365 to 01 02387 filed in France on Feb. 22, 2001; the entire content of which is hereby incorporated by reference.

TECHNICAL FIELD

The invention relates to a device for joining a panel and any structure, between which significant forces are to be transmitted.

The invention applies in particular to the case where the panel is made of a composite material and where the structure is made of metal. However, it is not restricted to this particular case and also relates, for example, to the assembly of a metal panel and a metal structure.

The joint device according to the invention may particularly be used in aeronautics, for example in order to provide the connection between the wing and the fuselage of an aircraft, between wing panels and between fuselage sections. The joint device according to the invention may also be used in the space field, for example to assemble different sections of a launcher or of its boosters. Indeed, it allows the condition of the panel surfaces and, consequently the aerodynamic properties of the assembly not to be too markedly affected.

Prior Art

A usual technique of joining two parts consists in using at least one joint plate. This is placed on the parts to be assembled and connected to each of them by mounting components such as rivets, bolts etc. This assembly technique is particularly used in aeronautics, for example to make the joints between the wing and the fuselage of an aircraft. It may also be used to make the joints between two parts of the wing or between two parts of the fuselage.

However, this known technique is long and tricky to implement, particularly since it requires great precision of the bores, into which the mount components are received. Moreover, the excess thickness due to the presence of the joint plate may, in certain cases, pose problems of assembly (for example during the assembly of two elements of a thin wing: the small distance between the lower surface and the upper surface then makes it difficult to install a joint plate through the inside of the wing), or of aerodynamics (for example in the case of a joint plate mounted on the outer surface of a wing).

A known technique for joining two parts without creating a disturbance relative to the aerodynamics consists in using a connection known as a "piano", by virtue of its appearance, which is reminiscent in design of the keys of a piano. In this type of assembly, adjacent cut-outs or recesses are machined on the outer surfaces of the metal panels, along the edges to be assembled. Assembly is provided by bolts orientated along a direction approximately perpendicular to the joint surface of the panels and approximately parallel to their outer surface. Each bolt includes a nut and a head received respectively in two cut-outs facing each other of the assembled panels. If necessary, the continuity of the machined surface of the panels is provided by covering the channels with a protective plate or by filling them with a resin (for example when the assembly is made on an outer surface of the aeroplane; surface continuity then allows aerodynamic problems to be reduced).

However this assembly technique may be difficult to apply when one of the panels is made of a composite material. Indeed, machining deep juxtaposed cut-outs near the panel edge would make the latter lose a major part of its mechanical strength in this area.

Document U.S. Pat. No. 5,171,099 describes a device allowing a composite material panel and another structure to be assembled together. This device includes a set of mounts, evenly distributed along the interface between the parts.

Each mount includes a first hole, pierced in the composite material panel, perpendicular to its surfaces and near the edge to be assembled. A hollow cylinder, in which is housed a nut called a "barrel nut", captive in said cylinder, is inserted into this first hole. A second hole, approximately parallel to the panel surfaces, passes through the latter between the edge to be assembled and the first hole, approximately equidistant from said surfaces, in other words near the neutral fibre of the panel.

In this known arrangement, the assembly of the two parts is provided, in each mount, by a tension screw, which passes through the second hole formed in the panel as well as a flange integral with the structure onto which it is desired to fix the panel. More exactly, the head of the screw is supported on the flange while its threaded end is screwed into the barrel nut.

Such a device makes it possible to solve the problem posed by joining a composite material panel and another structure. However, it does not make it possible to transmit between the two parts all the forces which the structural elements could withstand if they were not weakened by the device, as shown in FIG. 1 of the appended drawings.

FIG. 1 shows an orthonormal frame in which has been shown as x-coordinates the pitch P (expressed, for example, in mm) separating two consecutive mounts of the joint device described in the document U.S. Pat. No. 5,171,099 and as y-coordinates the flux F transmitted between the two parts, in other words the force transmitted per unit of length of the joint. The flux F may particularly be expressed as daN/mm.

As is shown by curve A in FIG. 1, the flux F which may be withstood by the tension screws of the different mounts (assuming screws of constant section) increases when the number of mounts made on an joint device of given length increases, in other words when the pitch P separating two consecutive mounts diminishes.

Curve B in FIG. 1 shows the tear flux of the joint device, in other words the flux for which the composite material panel tears along the line formed by the first holes, under the effect of the forces applied between the two parts. Curve B shows that the maximum flux able to be transmitted through the joint device diminishes when the pitch P separating two consecutive mounts diminishes. Indeed, the closer the holes housing the barrel nuts are to each other, the less material there is between the latter in the composite material panel. This leads to an embrittlement of the panel, which may then tear approximately along the line formed by the holes.

The maximum flux, which may therefore be transmitted through the joint device under consideration, corresponds to the flux $F_0$ given by the intersection of curves A and B in FIG. 1. It is obtained for a pitch $P_0$ between the mounts.

Consequently, the joint device described in the document U.S. Pat. No. 5,171,099 is not adapted when the forces, which have to be able to be transmitted through it, exceed the maximum flux $F_0$, as is the case in certain applications, particularly in aeronautics.

Disclosure of the Invention

The exact object of the invention is an joint device using mounts comparable to those which are described in the document U.S. Pat. No. 5,171,099, in order particularly to be able to provide the joint between a composite material panel and another structure, while having an original arrangement allowing appreciably greater forces to be transmitted.

According to the invention, this outcome is obtained by means of a device for joining a panel and another structure, this device including a plurality of mounts distributed along an interface between the panel and the structure, each of the mounts including a nut embedded in the panel, near the interface, and a tension screw passing through parts of the panel and the structure adjacent to the interface, along a direction approximately perpendicular to the interface, said screw including a head supported on the structure and a threaded end screwed into the nut, characterised in that the nuts of the different mounts are arranged along at least two rows approximately parallel to the interface, in such a way that the nuts of the adjacent mounts are located in different rows.

As will be seen in greater detail subsequently, for a given number of mounts, of identical dimensions, this arrangement makes it possible to increase, in the panel, the quantity of material between two adjacent nuts and, consequently, to increase the flux of forces able to be transmitted by the joint device.

In a preferred embodiment of the invention, each nut is mounted in a cylinder which passes through the panel along a second direction approximately perpendicular to the first direction and to the surfaces of said panel.

To advantage, each cylinder then includes a countersunk head, housed in a complementary cavity formed on an outer surface of the panel, in such a way that an end surface of said head is flush with said outer surface. This arrangement makes it possible particularly to preserve the aerodynamic properties of the panel, in aerospace applications.

In this case, each cylinder also includes, preferably, a threaded end onto which is screwed a second nut supported on an inner surface of the panel. This arrangement is particularly advantageous in the event of the panel being made of composite material. Indeed it makes it possible to reduce the phenomena of delamination of this material, which could be caused by applying tensile/compressive forces essentially through the cylinders in which the nuts are mounted.

According to a first embodiment variant of the invention, the tension screws of the mounts of which the nuts are arranged in different rows transmit appreciably different forces and have larger cross-sections when the forces transmitted are more significant.

According to a second embodiment variant of the invention, the tension screws of the mounts of which the nuts are arranged in different rows transmit appreciably different forces and are made of a material having greater tensile strength when the forces transmitted are more significant.

According to a third embodiment variant of the invention, the tension screws of the mounts of which the nuts are arranged in different rows transmit appreciably different forces and clamp more tightly when the forces transmitted are smaller.

A preferred application of the invention relates to the case where the panel is made of a composite material. This application must not however be considered as restricting the scope of the invention, since the latter also relates to the assembly of metal panels.

Lastly, when the structure with which the panel is assembled is a metal panel, recesses used to house the heads of the tension screws are to advantage of machined into this metal panel.

BRIEF DESCRIPTION OF THE DRAWINGS

A description will now be given, by way of non-restrictive examples, of different embodiments of the invention, with reference to the appended drawings, in which.

DETAILED DESCRIPTION OF SEVERAL PREFERRED EMBODIMENTS OF THE INVENTION

Figure 2:
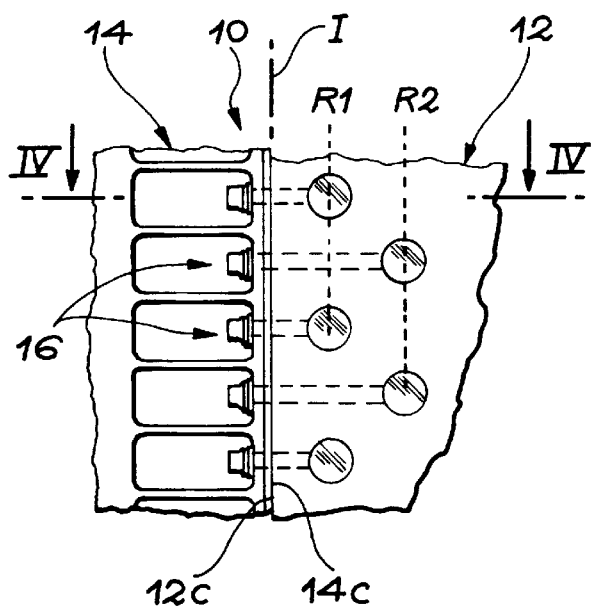
FIG. 2 is a view from above which shows an joint device according to a first embodiment of the invention.

As is shown diagrammatically in FIG. 2, in a view from above, the invention relates to an joint device 10 allowing the joint to be provided between a panel 12 and another structure 14.

The panel 12 has a surface 12a (FIG. 4) intended to be rotated outwards, known as the "outer surface" (orientated upwards in FIG. 2), a surface 12b (FIG. 4) intended to be rotated inwards, known as the "inner surface" (orientated downwards in FIG. 2), and an edge 12c intended to be assembled to the structure 14 by the joint device 10. The outer 12a and inner 12b surfaces may be plane and parallel to each other or have quite another shape, without departing from the context of the invention. Furthermore, the edge 12c may be plane and rectilinear, as has been shown in FIG. 2, curved or in the form of a broken line, without departing from the context of the invention.

In the preferred embodiments of the invention shown in the figures, the panel 12 is made of a composite material. More exactly, it includes a stack of layers of long fibres either woven or unwoven, embedded in a matrix of resin, said stack being made by corrugation according to techniques well known to the man skilled in the art, approximately parallel to one at least of the outer 12a and inner 12b surfaces of the panel or to its neutral fibre, located equidistant from said surfaces. As a variant, the panel 12 may however be made of another material such as a metal, without departing from the context of the invention.

In the embodiments shown by way of examples in the figures, the structure 14 also has the shape of a panel, able to be assembled edge to edge with the panel 12. In this case, the structure 14 includes a front surface 14a (FIG. 4) intended to be placed in the extension of the outer surface 12a of the panel, a rear surface 14b (FIG. 4) intended to be placed in the extension of the inner surface 12b of the panel 12 and an edge 14c complementary to the edge 12c of the panel 12. When the panel 12 and the structure 14 are assembled by means of the joint device 10, the edges 12c and 14c are fixed to each other along a common interface I.

As a variant, the structure 14 may also have quite another shape, without departing from the context of the invention. In this case, the edge 14c may particularly be formed on one or more flanges provided for this purpose, as described in the document U.S. Pat. No. 5,171,099. The structure 14 is generally made of metal.

As is shown more exactly in FIG. 2, the joint device 10 includes a plurality of mounts 16, distributed along the interface I defined between the edges 12c and 14c. More exactly, the mounts 16 act approximately along the neutral fibre of the panel 12 and are evenly distributed along the interface I according to a given pitch P.

Figure 4:
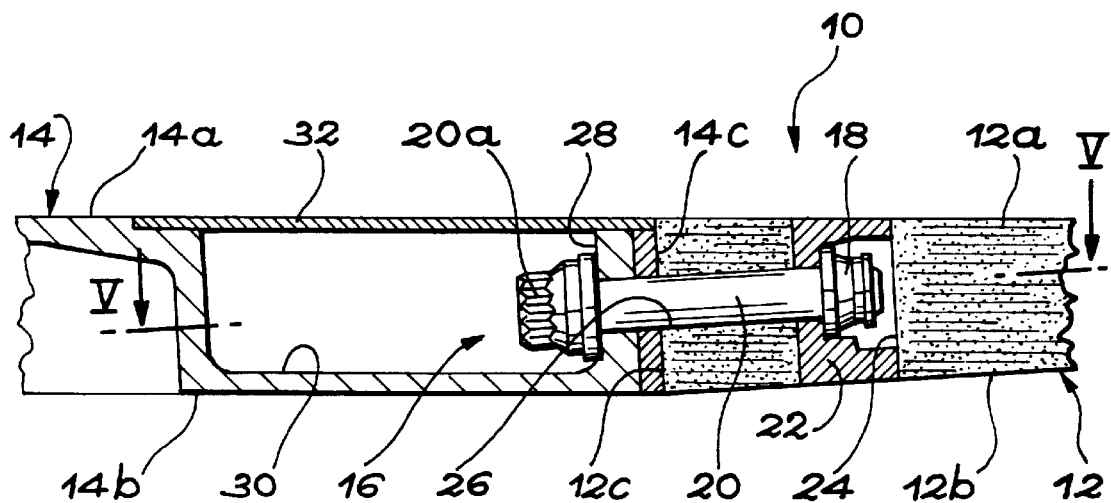
FIG. 4 is a cross-section view along the line IV—IV in FIG. 2, which shows on a larger scale one of the mounts of the joint device.
Figure 5:
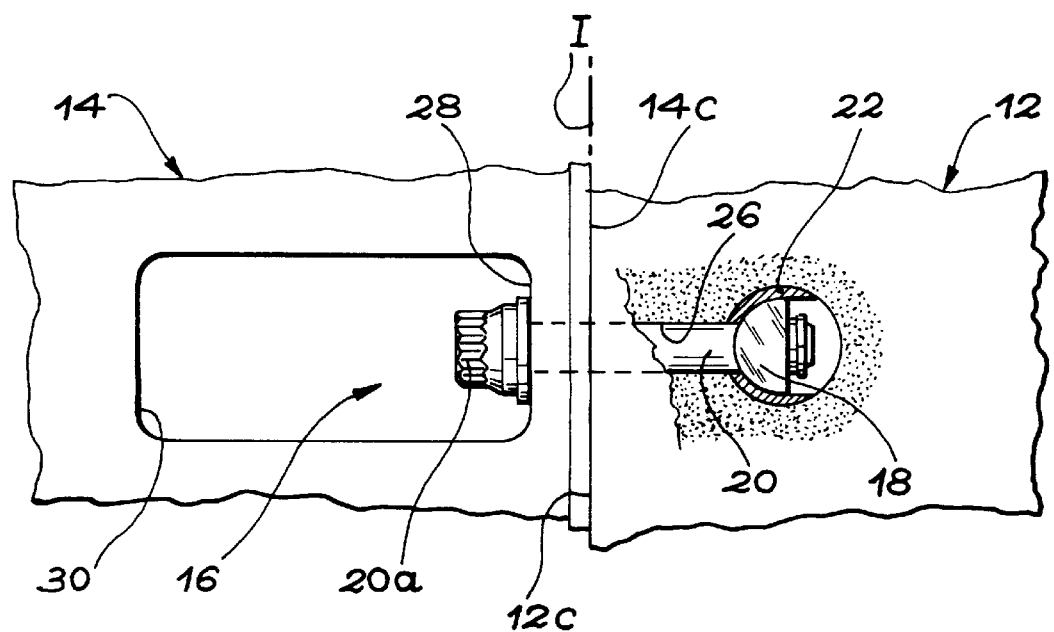
FIG. 5 is a view from above of the mount, in partial cross-section along the line V—V in FIG. 4.

As is shown in more detail in FIGS. 4 and 5, each of the mounts 16 includes a nut 18, embedded in the panel 12, and a tension screw 20 which passes through parts of the panel 12 and of the structure 14 adjacent to the interface I, along a first direction perpendicular to this interface and passing approximately through the neutral fibre of the panel 12.

More accurately, the nut 18 is captive in a hollow cylinder 22, itself housed in a hole 24 which passes through the panel 12, near to the interface I, along a second direction approximately perpendicular to the first, and to the outer 12a and inner 12b surfaces of the panel 12. The nut 18 is mounted in this cylinder 22 in such a way that its axis is orientated along the first direction when the cylinder is received in the hole 24. The assembly of the nut 18 in the cylinder 22 may be made in any way without departing from the context of the invention.

The screw 20 is housed in a hole 26, which is machined along the first direction into the parts of the panel 12 and of the structure 14 adjacent to the interface I. The hole 26 emerges in the hole 24, in such a way that a threaded end of the screw 20 may be screwed into the nut 18. At its opposite end, the screw 20 comprises a head 20a, intended to be supported against a support surface 28 of the structure 14. In this way, when the screw 20 is screwed into the nut 18 in such a way that its head 20a is supported against the surface 28, the panel 12 is assembled to the structure 14 by applying one against the other their edges 12c and 14c.

In the embodiments shown in the figures, which all relate to the case where the structure 14 is a metal panel, the head 20a of the screw 20 is received in a cut-out 30 made in the outer surface 14a of this panel and the support surface 28 is formed on one of the surfaces of this cut-out. A protective plate 32 may then close the cut-out 30, particularly so as to provide the aerodynamic continuity of the outer surface 14a.

In other embodiments, not shown, relating to the case where the structure 14 is not in the shape of a panel, the support surface 28 is constituted by the surface of a flange integral with said structure, opposite the edge 14c.

Figure 3:
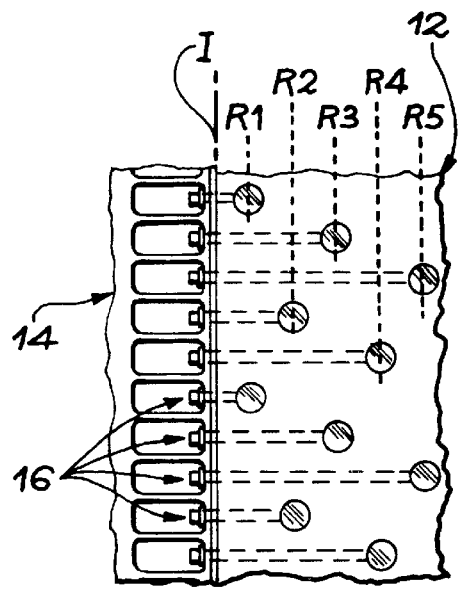
FIG. 3 is a view from above comparable to FIG. 2, which shows an joint device according to a second embodiment of the invention.

In accordance with the invention and as is shown particularly in FIGS. 2 and 3, instead of being all placed equidistant from the interface I, the nuts 18 and the cylinders 22 in which they are captive and the holes 24 into which these cylinders are received are placed along at least two distinct rows, located at different distances from the interface I. More accurately, the different rows are all parallel to the interface I, and the arrangement is such that the nuts 18 belonging to adjacent mounts 16 are located in different rows.

In FIG. 2, a first embodiment has been shown wherein the nuts 18 are arranged along two rows, denoted by the references R1 and R2.

FIG. 3 shows a second embodiment wherein the nuts 18 are arranged along five different rows, denoted by the references R1, R2, R3, R4 and R5.

For a given number of mounts 16, this arrangement in staggered rows of the nuts 18 makes it possible to increase the quantity of material between two holes 24 corresponding to two consecutive mounts. The result is less embrittlement of the panel to tensile and compressive forces. This arrangement therefore makes it possible to reduce the effective pitch of the mounts 16 and to increase proportionally the flux of forces able to be transmitted by the joint device 10.

Figure 1:
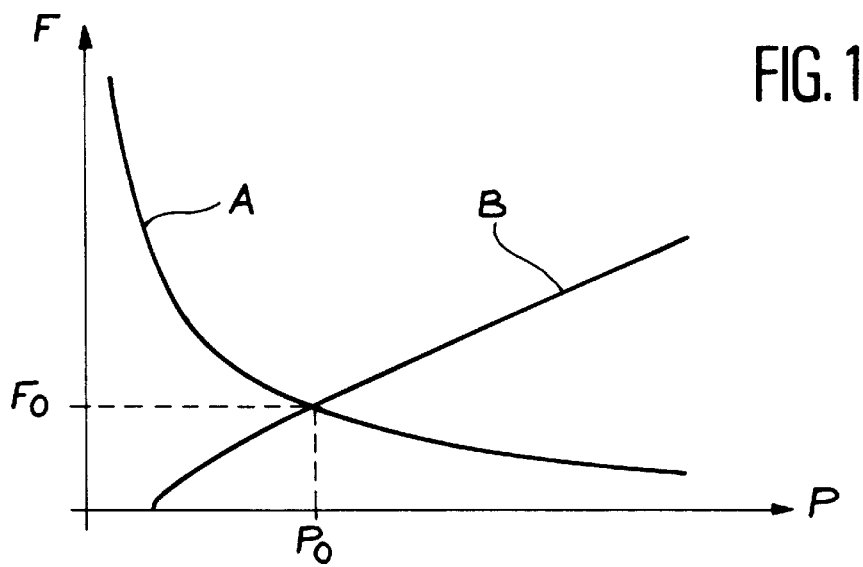
FIG. 1, already described, shows as A the variations in the flux F able to be applied to an joint device according to the document U.S. Pat. No. 5,171,099 and, as B, the variations in the flux corresponding in this case to the breaking point of a composite material panel, as a function of the pitch P between the mounts.
Figure 6:
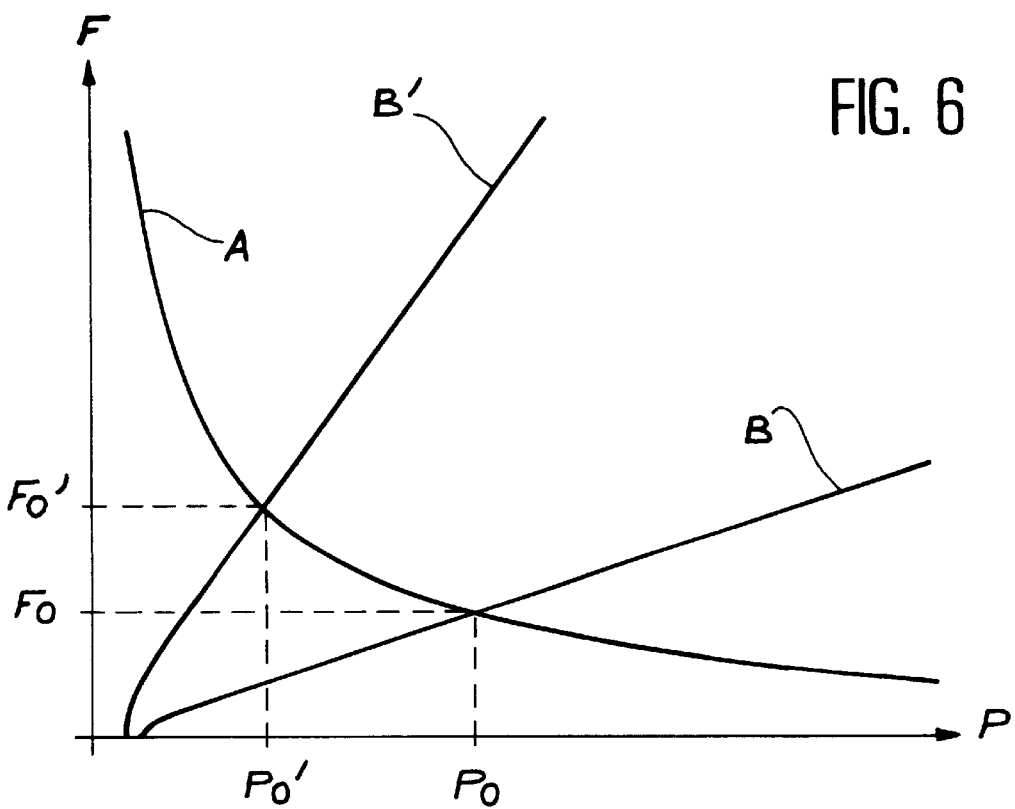
FIG. 6 is a view comparable to FIG. 1, in which curves A and B are shown, together with a curve B' showing the variations in flux corresponding to the breaking point of a composite material panel, as a function of the pitch P, in the case of a joint device according to the invention.

Like FIG. 1 previously described, FIG. 6 shows an orthonormal frame in which the pitch P (in mm) between two mounts 16 has been shown as the x-coordinates and the flux F (as daN/mm) of the forces transmitted between the panel 12 and the structure 14 has been shown as the y-coordinates.

In FIG. 6 curve A reappears, showing the change in the flux able to be withstood by the tension screws 20, as a function of the pitch P separating two consecutive mounts 16.

Also shown in FIG. 6 is curve B from FIG. 1, which shows the variations, as a function of the pitch P of the tear flux of a composite material panel assembled onto another structure by an joint device made according to the prior art, i.e. in which all the nuts of the different mounts are found at a same distance from the interface.

By way of comparison, curve B' in FIG. 6 shows the variations, as a function of the pitch P, of the tear flux of a composite material panel assembled onto another structure by a joint device made according to the invention, i.e. in which the nuts 18 are arranged alternately along at least two different rows.

Comparison of the intersection points of curve A with curves B and B' shows that the maximum flux Fo' of the forces able to be transmitted by the joint device 10 according to the invention is very clearly greater than the maximum flux Fo which can be transmitted by an joint device of the prior art. Furthermore, FIG. 6 also shows that the maximum flux Fo' is obtained by means of the invention for a pitch Po' appreciably smaller than the pitch Po corresponding to the maximum flux Fo of the prior art.

In the embodiment shown in FIGS. 4 and 5, the hollow cylinder 22 is flush with the outer 12a and inner 12b surfaces of the panel 12 without being fixed to it.

Figure 7:
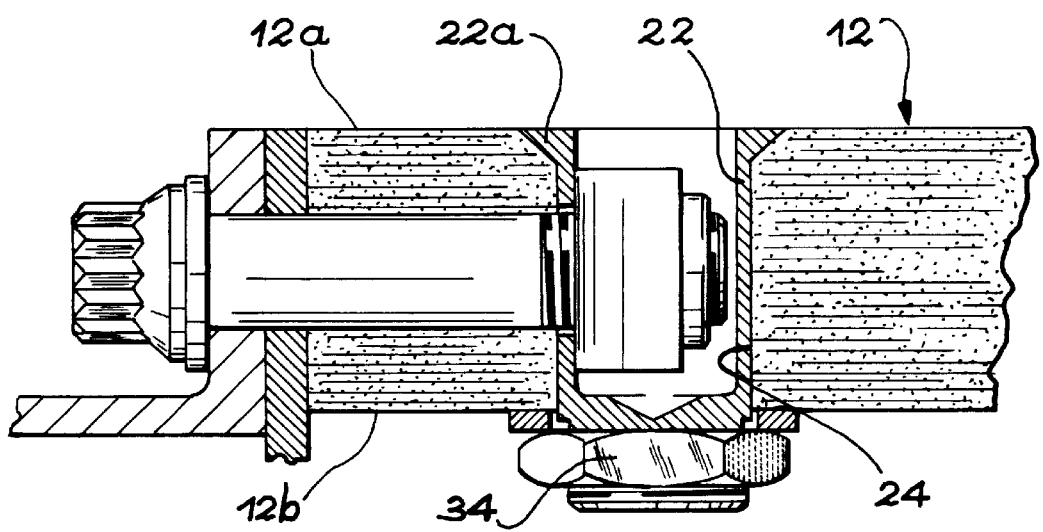
FIG. 7 is a cross-section view comparable to FIG. 4, showing an embodiment variant of the invention.

In an embodiment variant shown in FIG. 7, the hollow cylinder 22 comprises a countersunk head 22a, which is housed in a cavity of complementary shape formed on the outer surface 12a of the panel 12, at the end of the hole 24. This arrangement makes it possible to preserve the aerodynamic character of the outer surface 12a of the panel 12, by preventing bumps from appearing on this surface.

The opposite end of the hollow cylinder 22 comprises an external screw thread onto which is screwed a nut 34. During the assembly of the cylinder, the nut 34 is supported on the inner surface 12b of the panel 12, in such a way as to clamp the latter between the head 22a and the nut 34, along the axis of the cylinder 22. This clamping makes it possible to reduce the phenomena of delamination of the composite material and of rupture of the assembly, which could be caused by the tensile and compressive forces essentially applied to the panel 12 through the cylinders 22.

In the joint device 10 according to the invention, the forces, which are transmitted by mounts 16 of which the nuts 18 are located in different rows, may be appreciably different. On the basis of this observation, different embodiments or variants of the invention are proposed.

According to a first variant, larger cross sections are given to the tension screws 20 of the mounts 16 of which the nuts 18 are located in different rows when the forces transmitted are more significant, and conversely.

According to a second embodiment variant of the invention, the tension screws 20 of the mounts 16 of which the nuts 18 are arranged in different rows are made of a material whose tensile strength is greater when the forces transmitted are more significant, and conversely.

According to a third embodiment variant, the tension screws 20 the nuts of which are arranged in different rows are clamped more tightly when the forces transmitted are smaller, and conversely. Pre-stressing is thus applied to the screws transmitting the smaller forces, in such a way that the forces applied to the joint device are distributed more homogeneously between the different mounts.

Furthermore, it should be noted that the forces able to be transmitted through the joint device according to the invention become larger the greater the distance separating the different rows. Indeed, the result of this is an increase in the quantity of material (and therefore in the sheared cross-section) between the holes 24 of the adjacent mounts 16, which belong to different rows. The effect of this is to delay the rupture of the composite material and to use still more the capacities of the tension screws 20, without appreciably increasing their mass. In the same spirit, an increase in the distance separating the first row (R1 in FIGS. 2 and 3) from the interface I has the same effect.

Comparative experiments were carried out on a first specimen made according to the prior art and on a second specimen made in accordance with the invention. In both cases, a specimen of carbon fibre was used constituted by a stack of 240 folds of the material IM7/977-2 at 145 g/m². Each of the mounts included a cylinder of 25 mm diameter of Marval X12H ref. NSA5081 and a tension screw of 15.9 mm diameter of Inconel 718 1510 Mpa.

The first specimen included two mounts the axes of which were spaced apart from each other by 57.5 mm and located at 50 mm from the lateral edges of the specimen, the axes of the cylinders also being spaced apart by 50 mm from the edge of the specimen simulating the interface of the assembly. The rupture of this first specimen occurred at 58880 daN, by rupture of the tension screws. Only the adding of a third intermediate mount would allow more significant forces to be transmitted. However, a mount identical to the two previous ones, according to the prior art, would lead to very significant embrittlement of the composite material, which prevents this solution from being envisaged.

The second specimen tested comprises the same mounts as the first, together with a third intermediate mount placed equidistant from the two previous ones. The cylinder of the third mount is further away from the edge of the specimen simulating the interface than the cylinders of the first two mounts. More accurately, this cylinder is located in a second row, 50 mm away from the first row in which the cylinders of the first two mounts are placed. The rupture of this second specimen occurred, by shearing in the composite material, for a tensile force of 84570 daN.

So, the experiments which were carried out show that the "scarf flux", defined as the ratio between the force transmitted by each mount and their apparent pitch, is equal to 511 daN/mm (58880/(2×57.6) for the first specimen (prior art) and to 979 daN/mm (84570/(3×28.8)) for the second specimen (invention). These observations show that implementing the invention makes it possible approximately to double the maximum flux which the joint device may transmit, thanks to the doubling of the pitch made possible by the arrangement in staggered rows of the nuts into which the tension screws are screwed.

Of course, the invention is not limited to the embodiments and variants which have been described by way of example. So, even if the invention is particularly advantageous in the case where the panel is made of composite material, given the tearing problems posed by such a panel, it may also be used with panels made of any other material and particularly of metal. Furthermore, the invention is not limited exactly to the different mounts described. In particular, the nut-hollow cylinder unit may have any other form known to the man skilled in the art without departing from the context of the invention.

What is claimed is:

1. A device for joining a panel and another structure, this device including a plurality of mounts distributed along an interface between the panel and the structure, each of the mounts including a nut embedded in the panel, near the interface, and a tension screw passing through parts of the panel and the structure adjacent to the interface, along a first direction approximately perpendicular to the interface, said screw including a head supported on the structure and a threaded end screwed into the nut, wherein the nuts of the different mounts are arranged along at least two rows approximately parallel to the interface, in such a way that the nuts of the adjacent mounts are located in different rows.

2. A joint device according to claim 1, wherein each nut is mounted in a cylinder which passes through the panel along a second direction approximately perpendicular to the first direction and to the surfaces of said panel.

3. A joint device according to claim 2, wherein each cylinder includes a countersunk head, housed in a complementary cavity formed on an outer surface of the panel, in such a way that an end surface of said head is flush with said outer surface.

4. A joint device according to claim 3, wherein each cylinder also includes a threaded end, onto which is screwed a second nut supported on an inner surface of the panel.

5. A joint device according to claim 3, wherein the tension screws of the mounts of which the nuts are arranged in different rows transmit appreciably different forces and have larger cross-sections when the forces transmitted are more significant.

6. A joint device according to claim 1, wherein the tension screws of the mounts of which the nuts are arranged in different rows transmit appreciably different forces and are made of a material having greater tensile strength when the forces transmitted are more significant.

7. A joint device according to claim 1, wherein the tension screws of the mounts of which the nuts are arranged in different rows transmit appreciably different forces and clamp more tightly when the forces transmitted are smaller.

8. A joint device according to claim 1, wherein said panel is made of a composite material.

9. A joint device according to claim 1, wherein said structure is a metal panel, cut-outs serving to house the heads of the tension screws being machined in said metal panel.

* * * * *